Dec. 11, 1951  J. E. VANCE  2,578,159
GARDEN HOSE REEL AND SPRINKLER
Filed June 16, 1949
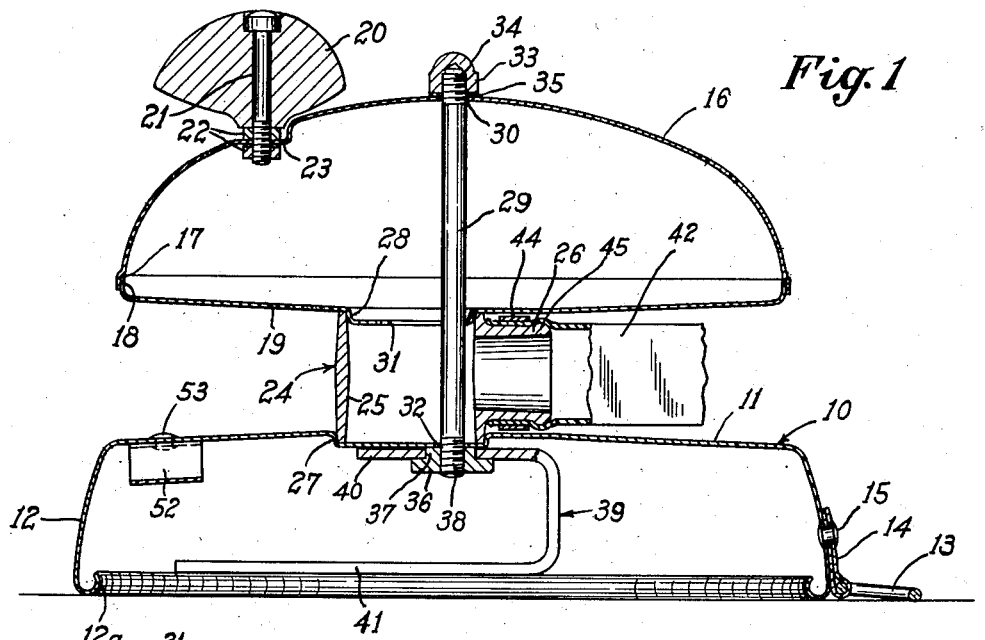
Fig. 1
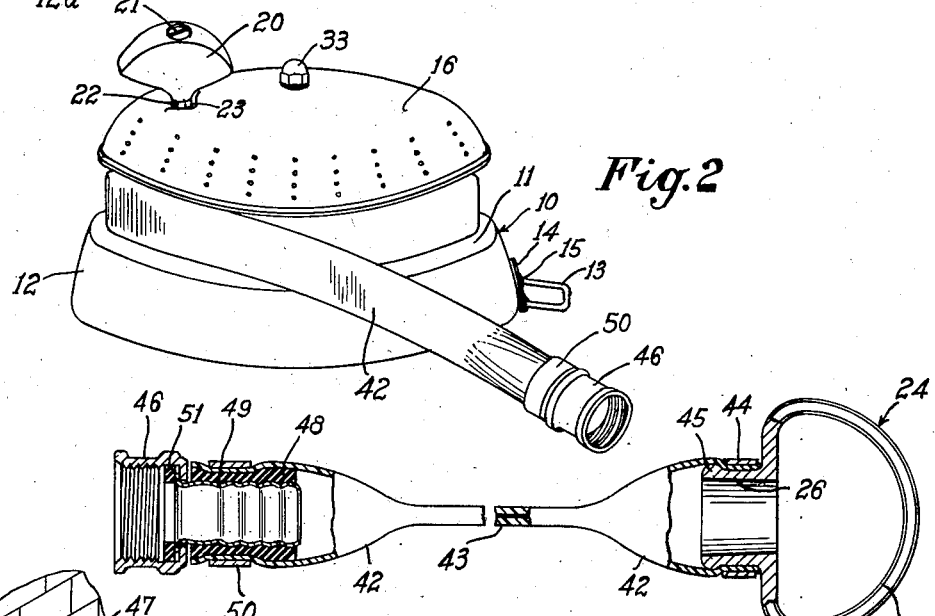
Fig. 2
Fig. 3
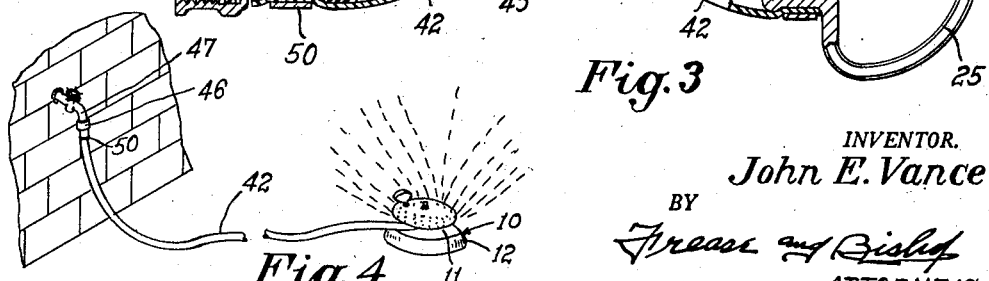
Fig. 4
INVENTOR.
John E. Vance
BY
ATTORNEYS Patented Dec. 11, 1951

2,578,159

UNITED STATES PATENT OFFICE 2,578,159

GARDEN HOSE REEL AND SPRINKLER

John E. Vance, North Canton, Ohio

Application June 16, 1949, Serial No. 99,381

4 Claims. (Cl. 299—53)

The invention relates to sprinklers for garden hose, and more especially to a sprinkler providing a reel upon which the hose may be coiled for storage when not in use.

Various types of sprinklers are widely used for watering lawns in connection with the conventional garden hose formed of rubber, or rubber and fabric, of a circular cross section. Considerable storage space is required for this hose when not in use. It is common practice to coil such hose upon a reel, or where the storage space is limited, to coil the hose and hang it upon a hanger on a wall.

Reels such as are at present in use for this purpose are not practical in many cases owing to the additional storage space required for the reel as well as the cost of a reel of sufficient size to accommodate the conventional hose.

By the use of suitable thermo-plastic material a comparatively light-weight, thin-walled hose may be provided which may be collapsed to substantially flat cross section when not in use.

The present invention contemplates the provision of a combined sprinkler and hose reel for use with such light-weight, thermo-plastic garden hose.

It is an object of the invention to provide a combined lawn sprinkler and hose reel with a collapsible, light-weight hose attached thereto and adapted to be reeled thereon when not in use.

Another object is to provide such a device comprising a base and a perforate, dome-shaped sprinkler head connected together in spaced relation by a T-shape member to which the hose is attached and upon which it is adapted to be coiled when not in use.

A further object is to provide a combined sprinkler and reel of the character referred to in which a swiveled handle is provided on the base and a knob upon the sprinkler head whereby the hose may be easily reeled thereon.

A still further object is to provide such a device in which the sprinkler head, base and substantially T-shape member are held tightly clamped together by a single, centrally located tie rod.

Another object is to provide such a combined sprinkler and hose reel which will occupy a relatively small space and which is provided with means for hanging the same upon a wall, with the hose coiled thereon, when not in use.

The above objects together with others which will be apparent from the drawing and following description, or which may be later referred to, may be attained by constructing the improved unit comprising a hose, a sprinkler and reel in the manner hereinafter described in detail and illustrated in the accompanying drawing, in which;

Figure 1 is a longitudinal, sectional view through the combined sprinkler and hose reel, showing the manner in which a hose is attached thereto;

Fig. 2 a perspective view of the combined sprinkler and reel, showing the hose reeled thereon;

Fig. 3 a detached, sectional elevation of the substantially T-shape member with the hose attached thereto; and Fig. 4 a perspective view on a smaller scale showing the device in use as a sprinkler.

Referring now more particularly to the construction illustrated in the accompanying drawing, in which similar numerals refer to similar parts throughout, the device is supported upon a base, indicated generally at 10, which may be formed of sheet metal, comprising the slightly convex top wall 11 with the downwardly and outwardly inclined peripheral flange 12 which may terminate at its lower edge in a rounded bead 12a adapted to rest upon the ground when in use.

For the purpose of hanging the device upon a wall when not in use, a ring 13 may be attached to the peripheral flange 12 as by means of a strap 14 and rivet 15, so positioned that the ring 13 is located adjacent to the beaded edge of the flange 12, as best shown in Fig. 1.

The sprinkler comprises the domed, perforate head 16, which may be formed of sheet metal and provided with the peripheral recess 17 to receive the upturned, peripheral flange 18 of the slightly convex bottom plate 19.

A knob 20, for operating the reel as will be later described, may be attached to the sprinkler head 16, at one side of the center thereof, as by means of the bolt 21 and nuts 22, the head being preferably provided with a slight flattened portion 23 to accommodate the nuts 22.

The sprinkler head and base are spaced apart, as best shown in Fig. 1, by means of a substantially T-shape member, indicated generally at 24 and comprising the substantially half-round, hollow, upright portion 25 and the angular nipple 26.

The top wall 11 of the base is recessed as at 27 to receive the lower end of the half-round upright portion 25 of the substantially T-shape member and the bottom plate 19 of the sprinkler is provided with the depending boss 28 which fits within the upper end thereof.

In assembling the parts, in order to make the structure watertight, suitable cement is placed between the peripheral flange 18 of the plate 19 and the peripheral recess 17 of the sprinkler head, between the boss 28 of the plate 19 and the upper end of the substantially T-shape member, and between the lower end of the substantially T-shape member and the recess 27 of the base.

These parts are clamped together by means of a tie rod 29, located through a central opening 30 in the sprinkler head, through the enlarged water inlet opening 31 in the boss 28 of the plate 19 and through a suitable opening 32 in the recessed portion of the top of the base, an acorn nut or the like 33 being located upon the upper screw threaded end 34 of the tie rod, a washer 35 being located between the acorn nut and the top of the domed sprinkler head, and a nut 36, provided with a reduced, spacer portion 37, being located upon the lower screw threaded end 38 of the tie rod. When the nuts 33 and 36 are tightened upon the tie rod the parts will be tightly clamped together and all joints will be watertight.

For the purpose of providing means for easily coiling the hose upon the substantially T-shape member 24, between the sprinkler head and the base, a substantially U-shaped handle, indicated generally at 39, is provided, the shorter leg 40 of this handle being swiveled upon the reduced spacer portion 37 of the nut 36 and the longer leg 41 thereof being sufficiently spaced therefrom so as to permit it to be grasped in one hand while the entire device may be rotated relative to this handle by means of the knob 28 which may be grasped in the other hand.

The hose, indicated generally at 42, is a relatively thin-walled tubing formed of thermoplastic material so constructed that when not inflated by water pressure therein, it will collapse into flat condition as indicated at 43 in Fig. 3.

This permits fifty feet of this hose to be coiled upon the combined sprinkler and hose reel of approximately 8 inches in diameter so that a light-weight, easily handled reel is provided which occupies a comparatively small storage space.

The inner end of the hose 42 is located over the nipple 26 of the substantially T-shape member, a conventional clamping ring 44 being provided for tightly clamping this end of the hose upon the nipple behind the peripheral rib 45 thereon.

The outer end of the hose 42 is attached to a conventional hose coupling 46 adapted to be connected to the usual screw threaded faucet indicated at 47 in Fig. 4. For the purpose of attaching one end of the hose to the coupling 46, a bushing 48 is interposed between the hose and the usual corrugated metal nipple 49, upon which the coupling 46 is swiveled as in ordinary practice, a conventional clamping ring 50 being provided for clamping the outer end of the hose tightly upon the bushing 48 and nipple 49. The usual washer 51 may be provided within the coupling 46.

If desired a finger rest 52 may be connected to the inside of the base, as by a rivet 53. With this construction, a compact, light-weight unit is provided comprising a combined hose, sprinkler and reel from which the hose may be easily uncoiled for use and upon which the hose may be easily and quickly coiled for storage.

I claim:

1. A combined sprinkler and hose reel comprising a substantially flat hollow base, a hollow, perforate sprinkler head of substantially the diameter of the base, a substantially T-shaped member located between the base and sprinkler head and communicating with the sprinkler head, and a hose connected at one end to the T-shape member and having a coupling at its other end, said hose being adapted to be coiled around said T-shape member, between the base and the sprinkler head, when not in use.

2. A combined sprinkler and hose reel comprising a hollow base, a hollow, perforate sprinkler head, a substantially T-shape member located between the base and sprinkler head and communicating with the sprinkler head, and a hose connected at one end to the T-shape member and having a coupling at its other end, said hose being adapted to be coiled around said T-shape member, between the base and the sprinkler head, when not in use, and a handle swivelled within the base.

3. A combined sprinkler and hose reel comprising a base having a substantially flat top wall and a depending peripheral flange, a sprinkler head comprising a domed perforate top and a substantially flat bottom wall, a substantially T-shape member located between the sprinkler head and the base, a tie rod clamping the bottom wall of the sprinkler head and the top wall of the base against opposite ends of the T-shape member, the bottom wall of the sprinkler head having an opening communicating with the T-shape member, and means for connecting a hose at one end to the T-shape member, said hose being adapted to be coiled around said T-shape member, between the base and the sprinkler head, when not in use.

4. A combined sprinkler and hose reel comprising a base having a substantially flat top wall and a depending peripheral flange, a sprinkler head comprising a domed perforate top and a substantially flat bottom wall, a substantially T-shape member located between the sprinkler head and the base, a tie rod clamping the bottom wall of the sprinkler head and the top wall of the base against opposite ends of the T-shape member, the bottom wall of the sprinkler head having an opening communicating with the T-shape member, and means for connecting a hose at one end to the T-shape member, said hose being adapted to be coiled around said T-shape member, between the base and the sprinkler head, when not in use, a U-shape handle and means upon the tie rod to which the handle is swiveled within the base.

JOHN E. VANCE.

REFERENCES CITED

The following references are of record in the file of this patent:

UNITED STATES PATENTS

| Number | Name | Date |
| --- | --- | --- |
| 1,653,103 | Keys | Dec. 20, 1927 |

FOREIGN PATENTS

| Number | Country | Date |
| --- | --- | --- |
| 169,181 | Switzerland | July 16, 1934 |